US009712271B2

United States Patent
Nagata et al.

(10) Patent No.: US 9,712,271 B2
(45) Date of Patent: Jul. 18, 2017

(54) RADIO BASE STATION, USER TERMINAL AND RADIO COMMUNICATION METHOD

(71) Applicant: NTT DOCOMO, INC., Tokyo (JP)

(72) Inventors: Satoshi Nagata, Tokyo (JP); Chunyi Wang, Beijing (CN); Xiaolin Hou, Beijing (CN); Atsushi Harada, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 33 days.

(21) Appl. No.: 14/759,944

(22) PCT Filed: Nov. 12, 2013

(86) PCT No.: PCT/JP2013/080559
§ 371 (c)(1),
(2) Date: Jul. 9, 2015

(87) PCT Pub. No.: WO2014/112191
PCT Pub. Date: Jul. 24, 2014

(65) Prior Publication Data
US 2015/0358098 A1 Dec. 10, 2015

(30) Foreign Application Priority Data
Jan. 15, 2013 (JP) .................................. 2013-004528

(51) Int. Cl.
*H04W 4/00* (2009.01)
*H04J 3/12* (2006.01)
(Continued)

(52) U.S. Cl.
CPC ................ *H04J 3/12* (2013.01); *H04J 4/00* (2013.01); *H04L 5/00* (2013.01); *H04W 24/10* (2013.01);
(Continued)

(58) Field of Classification Search
CPC ..... H04J 3/12; H04J 4/00; H04L 5/00; H04W 24/10; H04W 72/1231; H04W 72/1278; H04W 72/0446
See application file for complete search history.

(56) References Cited

U.S. PATENT DOCUMENTS

| 2013/0194982 A1* | 8/2013 | Fwu ................... H04W 72/0493 370/280 |
| 2013/0272170 A1* | 10/2013 | Chatterjee ............. H04W 28/02 370/280 |

(Continued)

OTHER PUBLICATIONS

International Search Report issued in PCT/JP2013/080559 mailed on Feb. 4, 2014 (1 page).

(Continued)

*Primary Examiner* — Jutai Kao
(74) *Attorney, Agent, or Firm* — Osha Liang LLP

(57) ABSTRACT

The present invention is designed to reduce the impact of interference even when different DL/UL configurations are applied between neighboring transmission points (radio base stations). A radio base station which can communicate with a user terminal by means of time division duplexing, and furthermore change and control the DL/UL configuration, has an interference measurement section that measures the interference level from other radio base stations in at least a UL subframe, and a scheduling control section that changes the feedback method of uplink control signals, which the user terminal feeds back in the UL subframe in response to downlink signals that have been transmitted in DL subframes, based on the measured interference level.

10 Claims, 15 Drawing Sheets

(51) Int. Cl.
*H04W 72/12* (2009.01)
*H04W 24/10* (2009.01)
*H04J 4/00* (2006.01)
*H04L 5/00* (2006.01)
*H04W 72/04* (2009.01)

(52) U.S. Cl.
CPC ... *H04W 72/1231* (2013.01); *H04W 72/1278* (2013.01); *H04W 72/0446* (2013.01)

(56) References Cited

U.S. PATENT DOCUMENTS

2013/0294268 A1* 11/2013 Xu .................. H04W 72/082 370/252
2014/0092785 A1* 4/2014 Song .................. H04L 1/00 370/280

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

\* cited by examiner

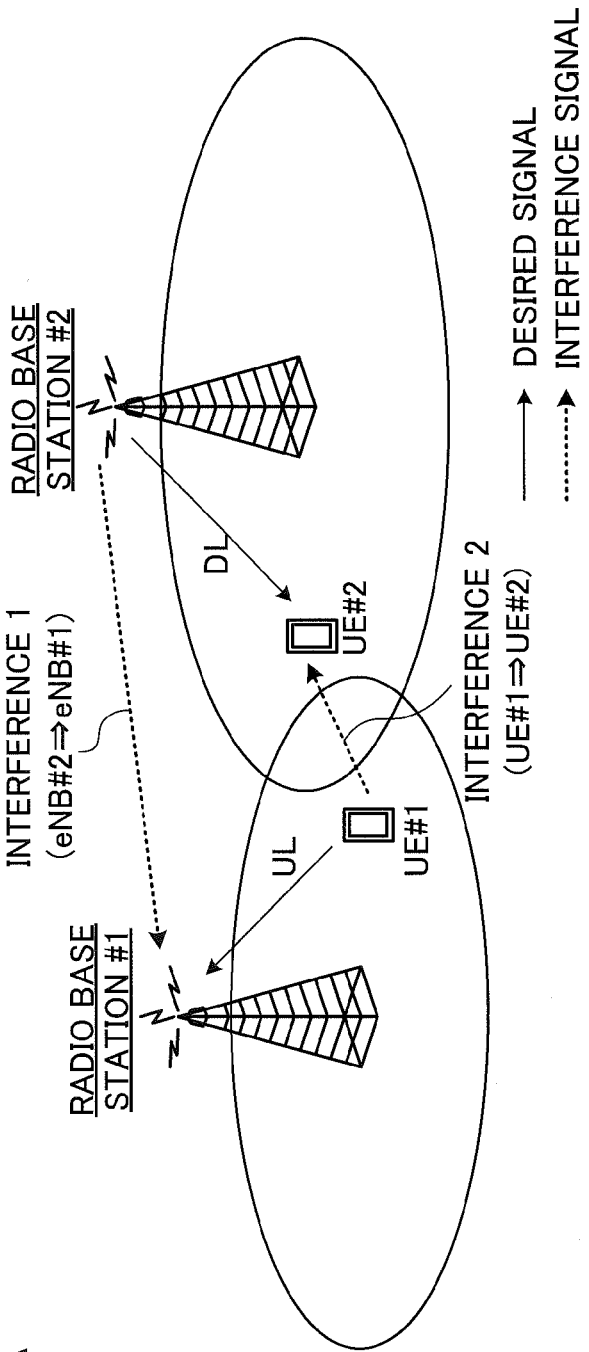
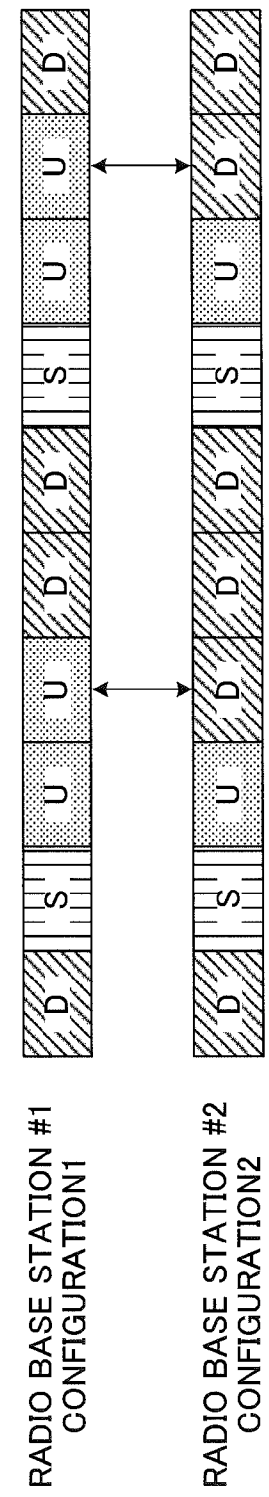
FIG.2A
FIG.2B

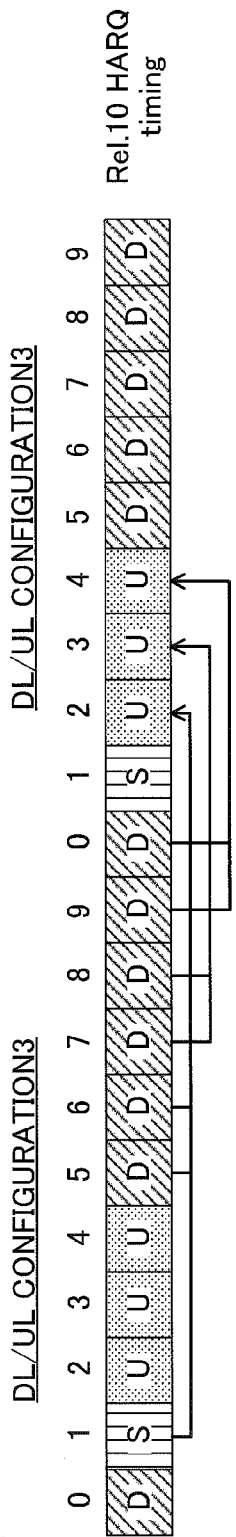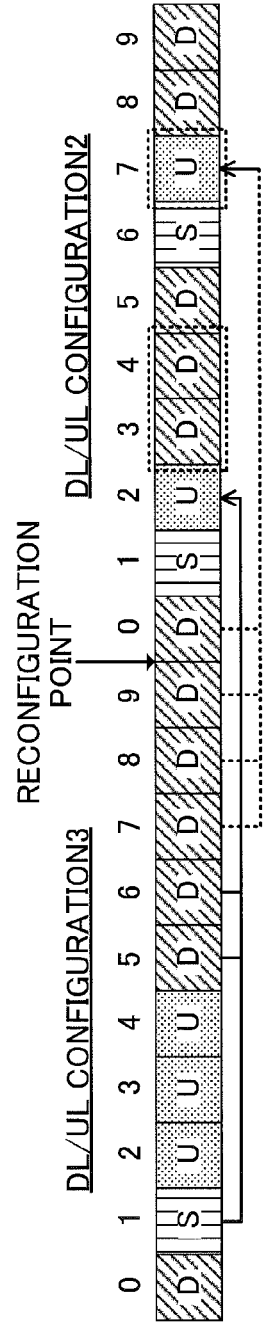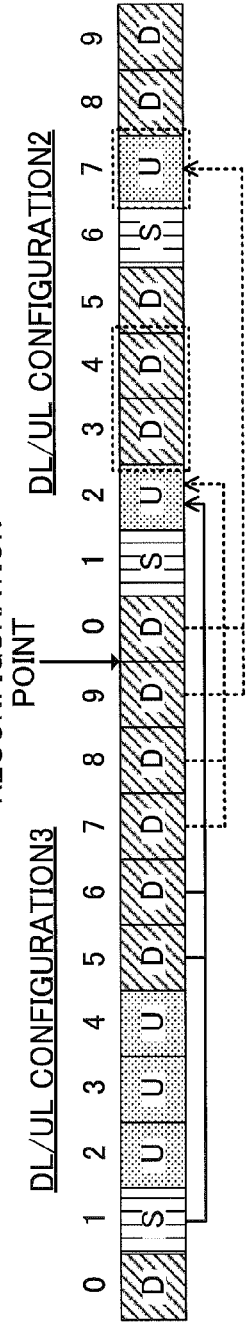

RADIO BASE STATION, USER TERMINAL AND RADIO COMMUNICATION METHOD

TECHNICAL FIELD

The present invention relates to a radio base station, a user terminal and a radio communication method that are applicable to cellular systems and so on.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band, which ranges from 1.4 MHz to 20 MHz. Also, in the UMTS network, successor systems of the LTE system (referred to as, for example, "LTE-advanced" or "LTE enhancement" (hereinafter referred to as "LTE-A")) are under study for the purpose of achieving further broadbandization and increased speed.

In radio communication, as uplink (UL) and downlink (DL) duplexing methods, there are frequency division duplexing (FDD), which divides the uplink and the downlink based on frequency, and time division duplexing (TDD), which divides the uplink and the downlink based on time. In the case of TDD, the same frequency is applied to uplink and downlink communication, and signals are transmitted and received to and from one transmission point by dividing the uplink and the downlink based on time. Since the same frequency is used in uplink and downlink communication, a transmitting point (radio base station) and a user terminal both have to switch between transmission and reception alternately.

Also, in TDD in the LTE system, a plurality of frame structures ("DL/UL configurations"), in which the ratio of transmission varies between uplink subframes and downlink subframes, are defined (see FIG. 1). In the LTE system, as shown in FIG. 1, seven frame structures—namely, DL/UL configurations 0 to 6—are defined, where subframes #0 and #5 are allocated to the downlink, and subframe #2 is allocated to the uplink. Also, to prevent interference between transmitting points (or between cells), the same DL/UL configuration is applied between neighboring transmitting points.

CITATION LIST

Non-Patent Literature

Non-Patent Literature 1: 3GPP, TR 25.912 (V7.1.0), "Feasibility Study for Evolved UTRA and UTRAN," September 2006

SUMMARY OF INVENTION

Technical Problem

However, in TDD in the LTE-A system, a study is in progress to change the transmission ratio of DL and UL dynamically or semi-statically in the time domain per transmitting/receiving point, in order to allow efficient use of radio resources. In this case, a structure may be employed in which the DL/UL configuration to apply is controlled to change per transmitting/receiving point.

When different DL/UL configurations are applied between neighboring transmitting/receiving points, cases might occur where, in the same time region/frequency region, a DL subframe and a UL subframe are transmitted at the same time between neighboring transmitting/receiving points (cases where an uplink signal and a downlink signal are transmitted at the same time). In this case, depending on the location and transmission power of each transmitting/receiving point (or user terminal) and so on, there is a threat that interference is produced between the transmitting/receiving points and/or between user terminals, and the communication quality performance deteriorates.

The present invention has been made in view of the above, and it is therefore an object of the present invention to provide a radio base station, a user terminal and a radio communication method that can reduce the impact of interference even when different DL/UL configurations are applied between neighboring transmitting/receiving points (radio base stations).

Solution to Problem

The radio base station of the present invention is a radio base station that can communicate with a user terminal by means of time division duplexing and furthermore change and control a DL/UL configuration, and this radio base station has an interference measurement section that measures an interference level from another radio base station in at least a UL subframe, and a scheduling control section that changes a feedback method of uplink control signals, which the user terminal feeds back in the UL subframe in response to downlink signals that have been transmitted in DL subframes, based on the measured interference level.

Advantageous Effects of Invention

According to the present invention, it is possible to reduce the impact of interference even when different DL/UL configurations are applied between neighboring transmission points (radio base stations).

BRIEF DESCRIPTION OF DRAWINGS

FIG. 2 provides diagrams to show an example of a radio communication system where different DL/UL configurations are applied between neighboring radio base stations;

FIG. 4 provides diagrams to explain a method of selecting a UL subframe for feeding back uplink control signals in response to each DL subframe in accordance with a reconfiguration of the DL/UL configuration;

DESCRIPTION OF EMBODIMENTS

First, an example of a radio communication system where the present embodiment is applied will be described with reference to FIG. 2A. The radio communication system shown in FIG. 2A is formed by including a plurality of transmitting/receiving points (here, radio base stations #1 and #2), and user terminals #1 and #2 that communicate with radio base stations #1 and #2.

Between radio base station #1 and user terminal #1 and between radio base station #2 and user terminal #2, radio communication is conducted by means of time division duplexing (TDD). That is, in radio base stations #1 and #2, the same frequency regions are applied to DL and UL transmission, and DL and UL are divided in the time domain and transmitted.

Figure 3A:
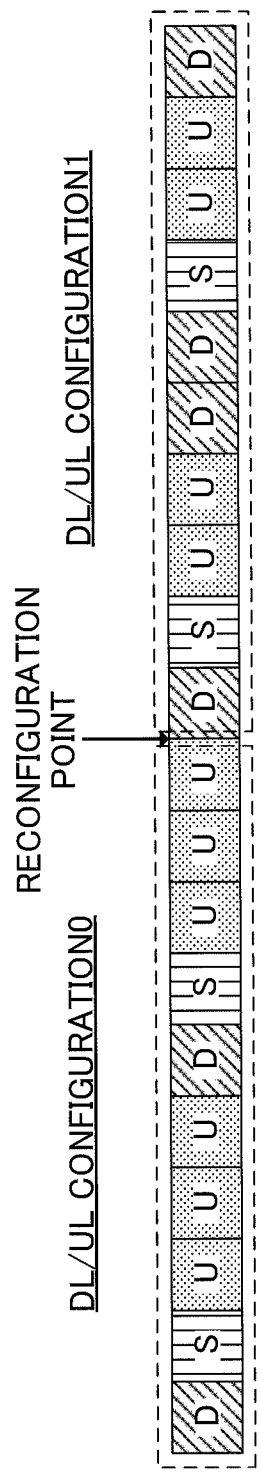
FIG. 3 provides diagrams to show example cases where DL/UL configurations are reconfigured.

In LTE-A, a mode of communication, in which radio base stations #1 and #2 each change and control the DL/UL configuration dynamically, is under study. For example, radio base stations #1 and #2 each can reconfigure from DL/UL configuration 0 to DL/UL configuration 1, as shown in FIG. 3A. By reconfiguring the DL/UL configuration as appropriate depending on the environment of communication, it becomes possible to control the communication system flexibly and achieve improved throughput. For example, when a large amount of data is transmitted from a user terminal to a radio base station, a DL/UL configuration with many UL subframes is selected. On the other hand, when a large amount of data is transmitted from a radio base station to a user terminal (for example, when the user terminal downloads movies and so on), a DL/UL configuration with many DL subframes is selected.

Now, according to TDD of Rel. 10, a user terminal that has received a downlink signal (for example, a PDSCH signal) via a DL subframe feeds back an uplink control signal (for example, a delivery acknowledgment signal (HARQ-ACK)) in response to that downlink signal in a UL subframe. When this takes place, the uplink control signals, which are generated in response to each DL subframe's downlink signal, are fed back using predetermined UL subframes. That is, a predetermined UL subframe is associated with each DL subframe. Consequently, when the DL/UL configuration is reconfigured, cases might occur where, when a user terminal receives a downlink signal, the DL/UL configuration is reconfigured before the user terminal feeds back an uplink control signal (PUCCH signal).

Figure 3B:

For example, assume a case where, as shown in FIG. 3B, DL/UL configuration 4 is configured to DL/UL configuration 2. If the DL/UL configuration is not reconfigured, the delivery acknowledgment signals in response to the PDSCH signals transmitted in DL subframes 6, 7, 8 and 9 in DL/UL configuration 4 are fed back in UL subframe 3 of the next frame. However, in DL/UL configuration 2 after the reconfiguration, the third subframe is a DL subframe, and therefore the delivery acknowledgment signals cannot be fed back. In this way, when the DL/UL configuration is controlled on a changing basis, applying the mechanism of feeding back delivery acknowledgment signals according to Rel. 10 on an as-is basis may lead to a threat of creating problems upon feedback of delivery acknowledgment signals.

So, assuming that the DL/UL configuration is reconfigured, a method of selecting the UL subframes to feed back the uplink control signals (for example, delivery acknowledgment signals) that are generated in response to each DL subframe, (each PDSCH signal) is under study. Now, an example of a UL subframe selection method will be described below with reference to FIG. 4. FIG. 4A illustrates a case where DL/UL configuration 3 is not reconfigured, while FIGS. 4B and 4C illustrate cases where DL/UL configuration 3 is reconfigured to DL/UL configuration 2.

FIG. 4A shows a case where, as the method of feeding back delivery acknowledgment signals in response to the PDSCH of each DL subframe, the same method as in Rel. 10 is employed. The delivery acknowledgment signals in response to the PDSCH signals of subframes 1, 5 and 6 are fed back in UL subframe 2 of the next frame. Also, the delivery acknowledgment signals in response to the PDSCH signals of subframes 7 and 8 are fed back in UL subframe 3 of the next frame, and the delivery acknowledgment signals in response to the PDSCH signals of subframes 9 and 0 are fed back in UL subframe 4.

DL/UL configuration 2 is different from DL/UL configuration 3 in that subframes 3 and 4 are DL subframes and subframe 7 is a UL subframe. So, it is possible to employ a structure in which, when a UL subframe to feed back delivery acknowledgment signals is reconfigured to a DL subframe accompanying a reconfiguration of the DL/UL configuration, the nearest UL subframe from the next subframe and later is used (see FIG. 4B).

In FIG. 4B, the delivery acknowledgment signals in response to the PDSCH signals transmitted in subframes 1, 5 and 6 in DL/UL configuration 3 are fed back in UL subframe 2 of the next frame, as in the case where the DL/UL configuration is not reconfigured. Meanwhile, the delivery acknowledgment signal in response to the PDSCH signals transmitted in subframes 7 and 8, 9 and 0 are fed back using the nearest UL subframe (here, UL subframe 7) after subframe 4 in DL/UL configuration 2.

Also, as another method of selecting UL subframes, a structure to select the nearest UL subframe that comes at least four subframes after each DL subframe for the delivery acknowledgment signals in response to each DL subframe may be employed as well (see FIG. 4C). In FIG. 4C, the delivery acknowledgment signals in response to the PDSCH signals transmitted in subframes 1, 5 and 6 of DL/UL configuration 3 are fed back in UL subframe 2 of the next frame, as in the case where the DL/UL configuration is not reconfigured. Meanwhile, the delivery acknowledgment signals in response to the PDSCH signals transmitted in subframe 7 and 8 are fed back using UL subframe 2, which is the nearest subframe that comes four subframes or more later. Similarly, the delivery acknowledgment signals in response to the PDSCH signals transmitted in subframes 9 and 0 are fed back using UL subframe 7, which is the nearest subframe that comes four subframes or more later.

In this way, by reconfiguring the UL subframe to feed back uplink control signals in response to DL subframes in accordance with reconfigurations of the DL/UL configuration, it is possible to feed back delivery acknowledgment signals adequately.

Meanwhile, the present inventors have found out that, even when the method of feeding back uplink control information is reconfigured in accordance with reconfigurations of the DL/UL configuration as shown in above FIG. 4, there is still a threat that the communication quality performance deteriorates in predetermined subframes if different DL/UL configurations are applied between neighboring radio base stations #1 and #2.

For example, assume a case where radio base station #1 employs DL/UL configuration 1 and radio base station #2 employs DL/UL configuration 2 as shown in FIG. 2B. In this case, in subframes 3 and 8, radio base station #1 carries out UL transmission, and radio base station #2 carries out DL transmission. That is, in these same time regions/same frequency regions, downlink signals are transmitted from radio base station #2 to user terminal #2, and uplink signals are transmitted from user terminal #1 to radio base station #1.

In this case, there is a threat that the downlink signals that are transmitted from radio base station #2 to user terminal #2 interfere with the uplink signals that are transmitted from user terminal #1 to radio base station #1 (interference 1 between radio base station #1 and radio base station #2). Also, there is a threat that the uplink signals that are transmitted from user terminal #1 to radio base station #1 interfere with the downlink signals that are transmitted from radio base station #2 to user terminal #2 (interference 2 between user terminal #1 and user terminal #2) (see FIG. 2A).

This as a result leads to a threat the received quality of radio base station #1 and the received quality of user terminal #2 might decrease in subframes 3 and 8. Usually, the transmission power of downlink signals that are transmitted from a radio base station to a user terminal is greater than the transmission power of uplink signals that are transmitted from a user terminal to a radio base station. Consequently, the interference (interference 1 in FIG. 2A) which the downlink signals transmitted from the radio base station cause against the uplink signals (for example, uplink control signals) transmitted from the user terminal might have a particularly large impact.

In this way, when different DL/UL configurations are applied between neighboring radio base stations, there is a threat that, when a DL subframe and a UL subframe overlap, the interference by downlink signals against an uplink control channel (PUCCH) (interference between radio base stations) have an increased impact, and the quality of communication deteriorates.

So, taking into account the interference that is received from other radio base stations and so on in UL subframes, the present inventors, have found that it is possible to reduce the impact of interference, even when different DL/UL configurations are applied between a plurality of transmitting/receiving points, by reconfiguring and controlling the method of feeding back uplink signals (for example, delivery acknowledgment signals) that are generated in response to the downlink signal of each DL subframe.

Also, considering the interference that is received from other radio base stations and so on in UL subframes, the present inventors have found out that it is possible to reduce the interference between radio base stations by reconfiguring the DL/UL configuration, transmission power and so on of radio base stations that cause interference (interfering stations) and/or radio base stations that receive interference (interfered stations).

Figure 1:
FIG. 1 is a diagram to explain examples of DL/UL configurations in TDD.

Now, the present embodiment will be described below in detail with reference to the accompanying drawings. Note that, although examples with two or three transmitting/receiving points (radio base stations) will be described in the following description, the number of transmitting/receiving points which the present invention can deploy is by no means limited to these. Also, although structures defined in the LTE system (see FIG. 1) will be described herein as examples of DL/UL configurations to apply to each transmitting/receiving point, the DL/UL configurations that are applicable are by no means limited to these. Also, according to the present embodiment, "neighboring transmission points (radio base stations)" will refer to transmitting/receiving points having coverages that overlap partly or entirely.

First Example

Figures 5A, 5B:
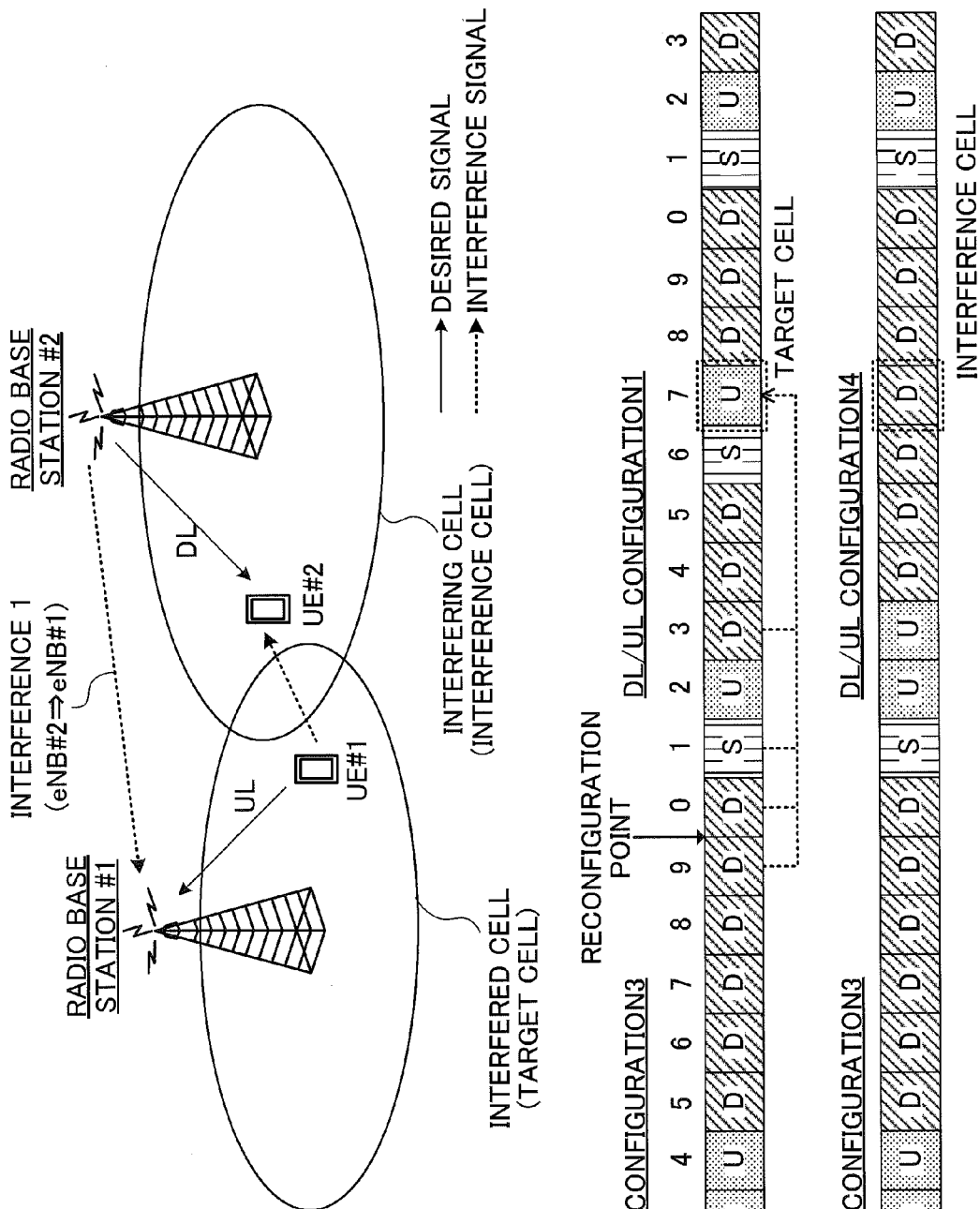
FIG. 5 provides diagrams to explain a method of selecting a UL subframe for feeding back uplink control signals in response to each DL subframe in a radio communication system where the DL/UL configuration is reconfigured.

FIG. 5A shows an example of a radio communication system according to a first example. The radio communication system of FIG. 5A is formed by including a plurality of transmitting/receiving points (here, radio base stations #1 and #2), user terminal #1 that communicates with radio base station #1, and user terminal #2 that communicates with radio base station #2. Note that, between radio base stations #1 and #2, information can be communicated by means of the $X_2$ interface, wired connection such as optical fiber and/or the like, or by wireless connection.

Time division duplexing (TDD) is applied to the communication between radio base station #1 and user terminal #1 and between radio base station #2 and user terminal #2. Also, in the radio communication system shown in FIG. 5A, radio base stations #1 and #2 each can change and control the transmission ratio of DL and UL (DL/UL configuration) in the time domain separately (independently). In this case, radio base stations #1 and #2 may each select arbitrary DL/UL configurations from the DL/UL configurations that are determined in advance (see FIG. 1), or may define arbitrary DL/UL configurations depending on the communication environment and so on.

FIG. 5 shows a case where radio base station #1 reconfigures from DL/UL configuration 3 to DL/UL configuration 1 and radio base station #2 reconfigures from DL/UL configuration 3 to DL/UL configuration 4. In this case, in subframe 7 after the reconfiguration of the DL/UL configuration, radio base station #1 transmits a UL subframe and radio base station #2 transmits a DL subframe (see FIG. 5B). Also, even when the DL/UL configuration is reconfigured as shown in FIG. 5B, by applying the mechanism illustrated in above FIG. 3, user terminal #1 that is connected with radio base station #1 can feed back the delivery acknowledgment signals (HARQ-ACKs) in response to the PDSCH signals of subframes 9, 0, 1 and 3, in UL subframe 7. Note that FIG.

5A is equivalent to a schematic diagram of subframe 7 after the reconfiguration of the DL/UL configuration in FIG. 5B.

In this case, there is a threat that the downlink signals transmitted from radio base station #2 to user terminal #2 may become interference signals for radio base station #1 that receives the uplink signals transmitted from user terminal #1. That is, in subframe 7 after the reconfiguration of the DL/UL configuration of FIG. 5B, radio base station #1 to transmit the UL subframe becomes the interfered station (target cell), and radio base station #2 to transmit the DL subframe becomes the inteferring station (interference cell).

When the interference level (the amount of interference) from radio base station #2 against radio base station #1 is low, the impact of interference upon uplink signals transmitted from user terminal #1 is insignificant and is not a problem. Meanwhile, when the interference level from radio base station #2 to radio base station #1 is high, the impact on uplink signals (for example, uplink control signals such as delivery acknowledgment signals) transmitted from user terminal #1 grows, and this gives a threat of deterioration of communication quality performance.

So, with the present embodiment, each radio base station measures the interference level that is received from other radio base stations at least in a UL subframe, and controls the uplink control signal (for example, delivery acknowledgment signal) feedback method based on that interference level. To be more specific, depending on the interference level that is received from other radio base stations in a UL subframe, the UL subframe to feed back uplink control signals is selected. By this means, it is possible to reduce the impact of interference upon uplink control signals and so on transmitted from a user terminal.

To be more specific, radio base station #1 measures the interference level (interference level) as received from outside (here, radio base station #2), and controls the PUCCH signal feedback method (including selecting the UL subframe to use for feedback and so on) based on that interference level. For example, when the interference level (I) received from radio base station #2 in UL subframe 7 is low (for example, equal to or lower than a predetermined threshold (first threshold T0)), the delivery acknowledgment signals in response to the PDSCH signals of subframes 9, 0, 1 and 3 are controlled to be fed back using UL subframe 7 (see FIG. 5B).

The interference level can be measured by using the downlink or uplink received signal power. For example, it is possible to measure the interference level based on part or all of downlink reference signals (CRSs, CSI-RSs and so on), downlink data signal (PDSCH signal), downlink control signal (PDCCH signal) and the direction in which the downlink signals are transmitted. Note that, upon measurements of the interference level, it is possible to identify other radio base stations (or other radio base stations sets) that can be interfering stations in the radio communication system in advance, and measure the interference level from these radio base stations. Also, it is equally possible to measure the interference level from radio base stations that fulfill predetermined conditions (for example, radio base stations where the interference level is equal to or greater than a predetermined value, radio base stations that are present in a predetermined distance range from the subject apparatus, all the radio base stations that may cause interference, and so on), on a selective basis.

When, in UL subframe 7, the interference level I which radio base station #1 receives from another radio base stations #2 and so on is greater than the first threshold T0, the method of feeding back the uplink control signals (for example, delivery acknowledgment signals) that are generated in response to the downlink signal (for example, the PDSCH signal) transmitted in each DL subframe is reconfigured. For example, part or all of the uplink control signals in response to the PDSCH signals of subframes 9, 0, 1 and 3, associated with UL subframe 7, are fed back in a subframe apart from UL subframe 7. Note that the downlink signals transmitted in DL subframes may include downlink signals that are transmitted in special subframes.

For example, assume a case where the interference level I which radio base station #1 receives from another radio base stations #2 and so on in UL subframe 7 is greater than the first threshold T0 and is equal to lower than a second threshold T1 (T0<I≤T1). In this case, the number of DL subframes to associate with (multiplex over) UL subframe 7 is limited. Note that the number of DL subframes to associate with (multiplex over) UL subframe 7 refers to the number of DL subframes to correspond to the uplink control signals that are multiplexed and fed back in UL subframe 7, and becomes four in FIG. 5B.

The number of DL subframes to multiplex over one UL subframe can be determined based on the interference level and/or the transmission ratio of DL and UL (DL/UL configuration). For example, the number of DL subframes (N) to be actually multiplexed over one UL subframe is proportional to the value of dividing the number of subframes ($N_M$) to be multiplexed over this UL subframe when the interference level I is sufficiently low (I≤T0), by the interference level (I) received in the UL subframe (N□($N_M$/I)). That is, when the interference level is high, the number of uplink control signals to multiplex over one UL subframe (the number of DL subframes to associate with one UL subframe) is made smaller. Note that, the number of subframes ($N_M$) may be defined as the number of DL subframes to associate with the nearest UL subframe that comes at least four subframes after a PDSCH signal is transmitted.

Figure 6:
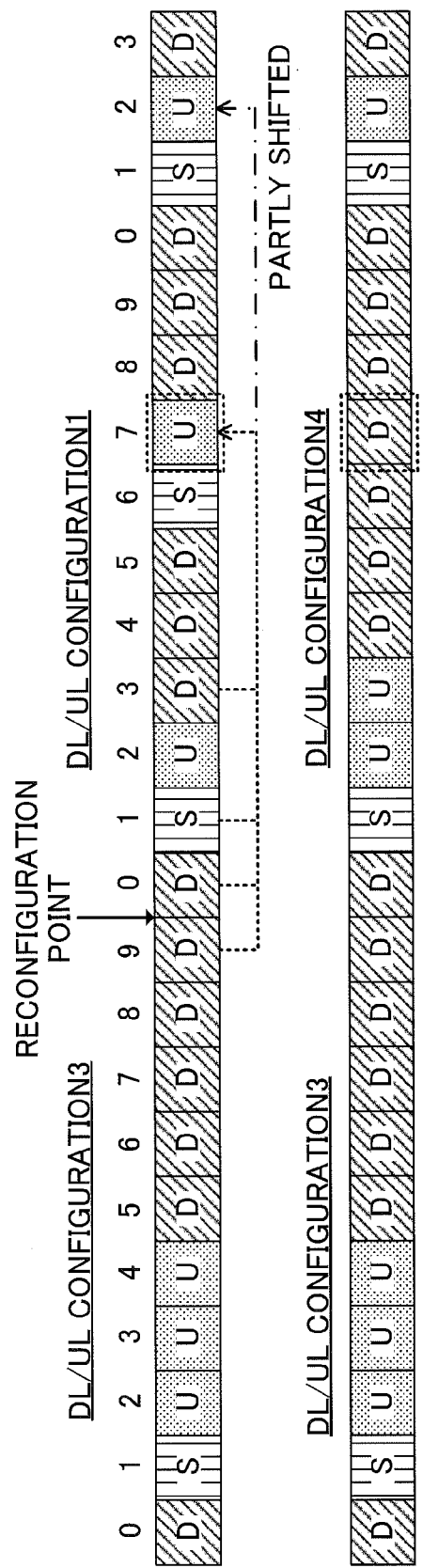
FIG. 6 is a diagram to show another example of a method of selecting a UL subframe for feeding back uplink control signals in response to each DL subframe.

When the interference level I against radio base station #1 is T0<I≤T1 in subframe 7, as shown in FIG. 6, part of a plurality of delivery acknowledgment signals, which are generated in response to the PDSCH signals of subframes 9, 0, 1 and 3, respectively, are fed back by using another UL subframe apart from UL subframe 7. For example, the delivery acknowledgment signals in response to the PDSCH signals of DL subframe (for example, subframes 9 and 0) that are transmitted relatively early in the time domain are fed back in UL subframe 7. Also, the delivery acknowledgment signals in response to the PDSCH signals of other DL subframes (for example, subframes 1 and 3) are fed back in a UL subframe that comes after UL subframe 7. That is, part of the uplink control signals are shifted and allocated to a different UL subframe.

As for the UL subframe to shift and allocate the uplink control signals to, it is possible to use the nearest UL subframe where the interference level is equal to or lower than a predetermined value (for example, the first threshold T0), among the UL subframes that come after subframe 7. In FIG. 6, a case is shown where the delivery acknowledgment signals in response to the PDSCH signals of subframes 1 and 3 are newly allocated to UL subframe 2.

In this way, by limiting the number of DL subframes to multiplex over a UL subframe (the number of uplink control signals) based on the interference level that is received from other radio base stations in that UL subframe, it is possible to lower the coding rate and reduce the deterioration of communication quality performance. Also, by using multiplexing instead of bundling, it is possible to guarantee the reliability of PUCCH signals (for example, delivery acknowledgment signals).

Figure 7:
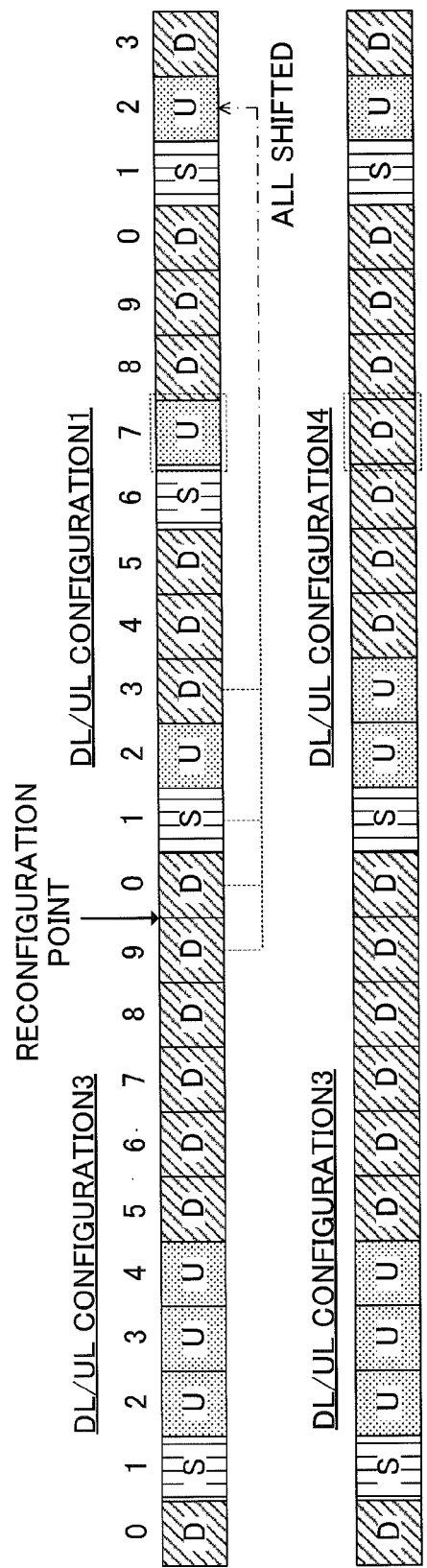
FIG. 7 is a diagram to show another example of a method of selecting a UL subframe for feeding back uplink control signals in response to each DL subframe.

Also, when, in UL subframe 7, the interference level I which radio base station #1 receives from another radio base stations #2 and so on is significantly high (for example, greater than the second threshold T1 (T1<I)), the UL subframe to use to feed back uplink control signals is reconfigured. For example, as shown in FIG. 7, the delivery acknowledgment signals in response to the PDSCH signals of subframes 9, 0, 1 and 3 are fed back from another UL subframe. That is, the uplink control signals are all shifted and allocated to a different UL subframe.

As for the UL subframe to shift and allocate the uplink control signals to, it is possible to use the nearest UL subframe where the interference level is equal to or lower than a predetermined value (for example, the second threshold T1), among the UL subframes that come after subframe 7. FIG. 7 shows a case where the delivery acknowledgment signals in response to the PDSCH signals of subframes 9, 0, 1 and 3 are newly allocated to UL subframe 2. Note that the mechanism shown in above FIG. 6 can be used when the interference level in UL subframe 2 is greater than the first threshold T0 and equal to or lower than the second threshold T1 (T0<I≤T1).

In this way, by reconfiguring (shifting) the UL subframe to feed back PUCCH signals (for example, delivery acknowledgment signals) based on the interference level received in a UL subframe, it is possible to reduce the impact of interference from downlink signals that are transmitted from other radio base stations. As a result of this, it is possible to reduce the deterioration of communication quality performance even when different DL/UL configurations are applied between neighboring transmission points.

Also, even when the DL/UL configuration is reconfigured, it is possible to effectively reduce the deterioration of communication quality performance by controlling the uplink control signal feedback method by further taking into account the interference level received from other radio base stations, in addition to applying the mechanism shown in above FIG. 3.

Figure 8:
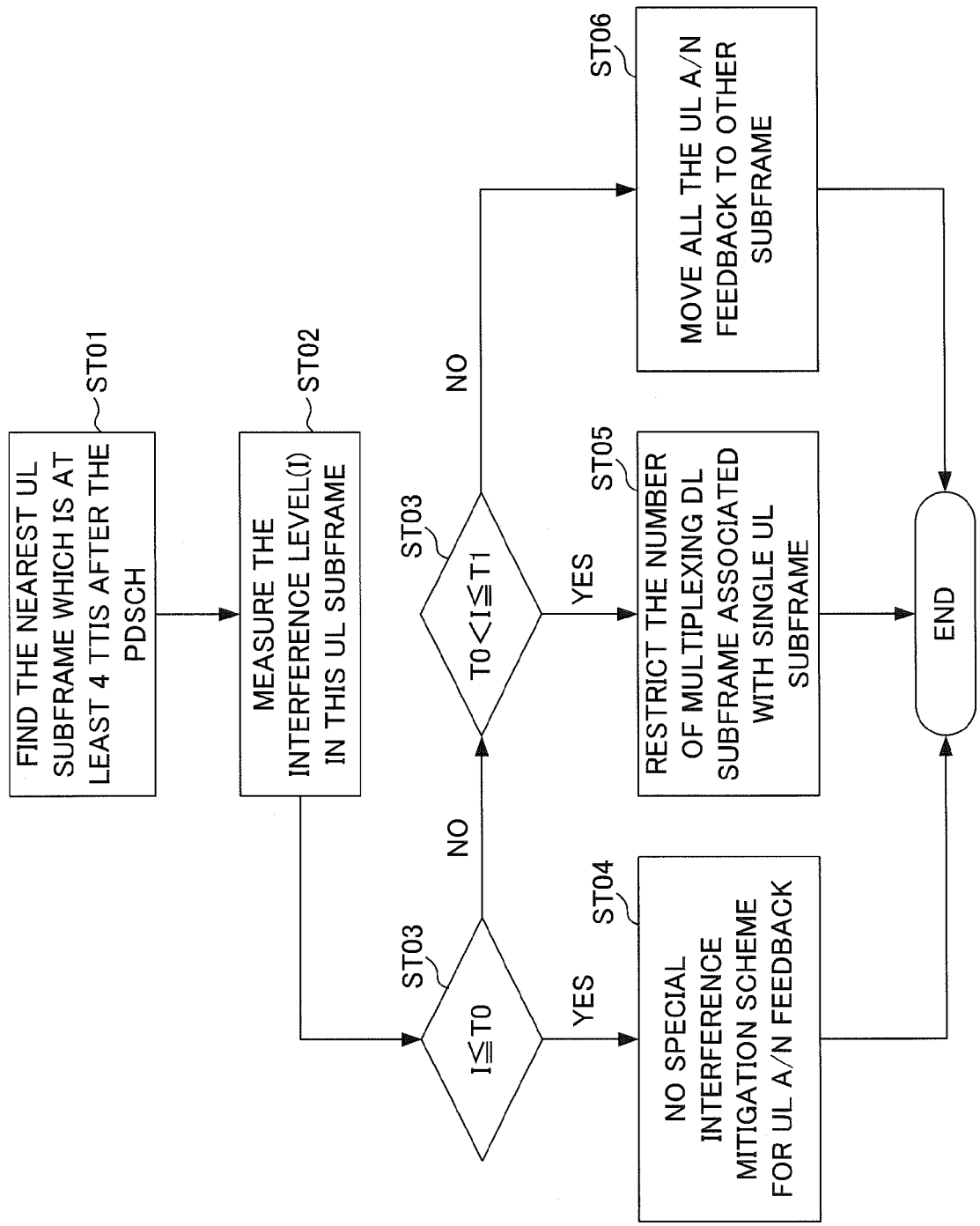
FIG. 8 is an example of a flowchart for determining a method of feeding back uplink control signals in response to downlink signals transmitted in DL subframes.

Next, an example of a radio communication method according to the first example will be described with reference to FIG. 8. First, each transmitting/receiving point (for example, radio base station #1 in FIG. 5) detects the nearest UL subframe that comes at least four subframes after DL subframe in which a PDSCH is transmitted (step ST01). Following this, the interference level from other radio base stations in that UL subframe is measured (step ST02). Following this, the interference level that is measured is compared against a predetermined threshold (step ST03). When the interference level from other radio base stations is low (when the interference level I is equal to or lower than a first threshold T0), the UL subframe to feed back a PUCCH signal is selected based on predetermined rules (the mechanism of Rel. 10, the mechanism of FIG. 3 and so on) (see step ST04 of FIG. 5B). Also, when the interference level from other radio base stations is somewhat high (when the interference level I is higher than the first threshold T0 and equal to lower than a second threshold T1), the number of DL subframes to multiplex over the UL subframe is limited (see step ST05 of FIG. 6). Also, when the interference level from other radio base stations is significantly high (when the interference level I is greater than the second threshold T1), the UL subframe to feed back the uplink control signals is reconfigured (see step ST06 of FIG. 7).

Second Example

A case will be described here with a second example where the present embodiment is applied to a structure in which macro cell M and many small cells S are placed to overlap geographically.

Figure 9:
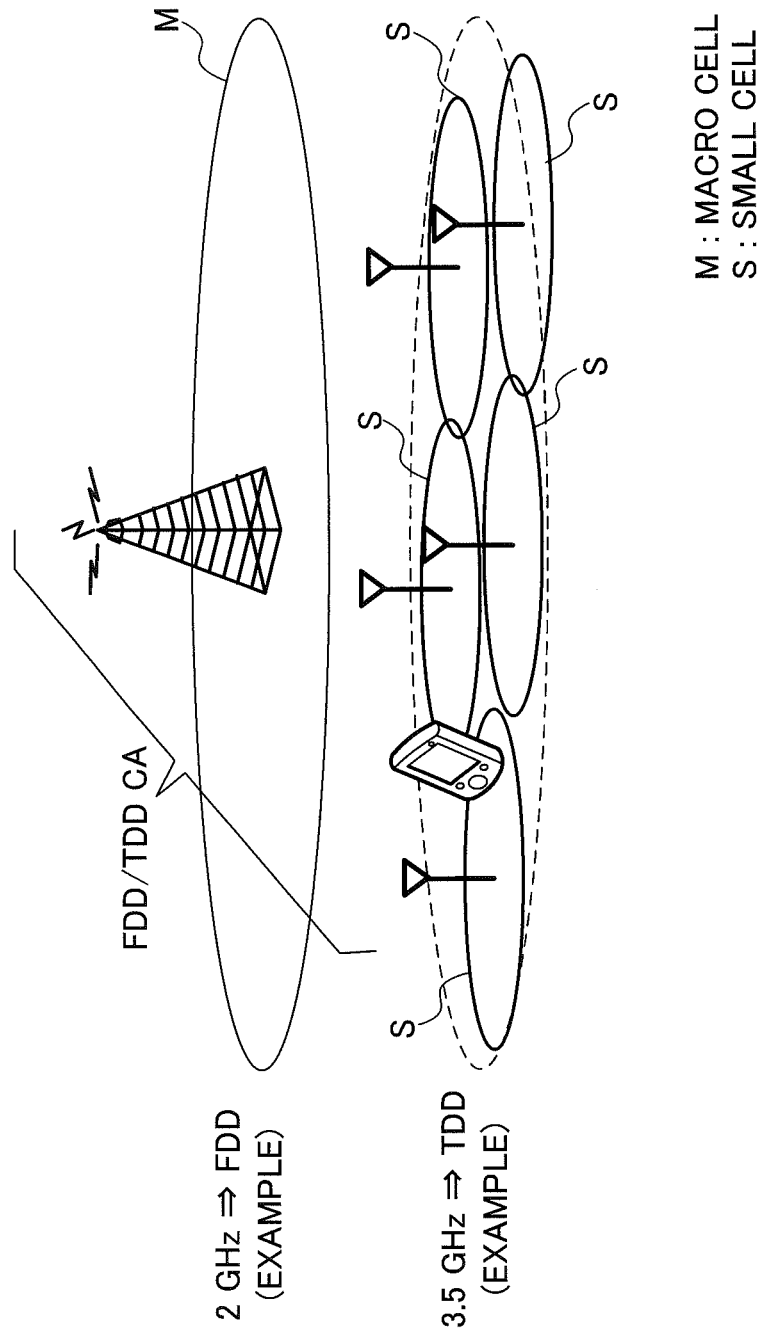
FIG. 9 is a diagram to show an example of a radio communication system where carrier aggregation (FDD/TDD CA) is conducted in FDD and TDD in a HetNet structure.

When a macro cell M and small cells S are placed to overlap geographically, as shown in FIG. 9, a heterogeneous network (hereinafter referred to as "HetNet") structure, in which the macro cell M and the small cells S use different carriers, may be possible. In the HetNet structure shown in FIG. 9, the small cells S use a dedicated carrier, so that it is possible to secure coverage with the macro cell M and secure capacity with the small cells S.

In FIG. 9, the macro cell M, which uses a low frequency band of, for example, the 2 GHz band, and the small cells S, which use a high frequency band of, for example, the 3.5 GHz band, are placed to overlap geographically. In the HetNet structure shown in FIG. 9, the macro cell M is a cell to have a relatively wide coverage (for example, a radius of approximately 10 km), and may be referred to as a "wide area" and so on, and may be a sector as well. Also, the small cells S are cells to have local coverages (for example, a radius of approximately several tens of meters), and may be referred to as "local areas," "pico cells," "nano cells," "femto cells," "micro cells," "eLA (enhanced Local Area) cells," and so on. The transmitting/receiving points (radio base stations) to form the macro cell M and the small cells S will be hereinafter referred to as the "macro base station" and the "small base stations," respectively.

Also, a case is illustrated with the HetNet structure shown in FIG. 9 where frequency division duplexing (FDD) is applied to the macro cell M, time division duplexing (TDD) is applied to the small cells S, and carrier aggregation (FDD/TDD CA) is applied between the macro cell M and the small cells S. Also, a case is assumed here where each small base station dynamically reconfigures and controls the DL/UL configuration.

When the above first example is applied to the structure illustrated in FIG. 9, the interference level between the small base stations is taken into account, and a UL subframe which receives little interference from other small base stations is selected as the UL subframe to feed back uplink control signals (for example, delivery acknowledgment signals).

Meanwhile, according to the second example, when the interference level that is received from other small base stations is greater than a predetermined threshold, a user terminal is controlled to feed back uplink control signals in response to the PDSCH signals received from the small base station, to the macro base station. That is, depending on the interference level that is received from other small base stations, either a UL subframe (TDD) that is configured by the small base stations or a UL subframe (FDD) that is configured by the macro base station is selected as the UL subframe to use to feed back uplink control signals.

For example, when the interference level I received from other small base stations in a UL subframe is equal to lower than predetermined threshold, the user terminal feeds back the delivery acknowledgment signaled in response to a PDSCH signal to the small base station. On the other hand, when the interference level I received from other small base stations in a UL subframe is greater than the predetermined threshold, the user terminal feeds back the delivery acknowledgment signal in response to a PDSCH signal to the macro base station.

Note that the interference level can be measured by using the downlink or uplink received signal power, similar to the above first example. For example, it is possible to measure the interference level based on part or all of downlink reference signals (CRSs, CSI-RSs and so on), downlink data signal, downlink control channel signal and the direction in which the downlink signals are transmitted.

In this way, a user terminal that is connected to a small base station where the interference level received from other small base stations is high feeds back the delivery acknowledgment signals in response to PDSCH signals received by using a TDD carrier, to the macro base station, via an FDD carrier, so that it is possible to reduce the interference to receive from other small base stations.

Third Example

A case will be described here with a third example where a plurality of radio base stations (for example, small base stations) each report the interference level to a central control station (for example, macro base station), and, based on these interference levels, the central control station controls each radio base station's DL/UL configuration, feedback method, transmission power and so on.

FIG. 10 shows an example of a radio communication system according to the third example. The radio communication system of FIG. 10 is formed by including a plurality of transmitting/receiving points (here, radio base stations #1 to #3), user terminals #1 to #3 that serve radio base stations #1 to #3, respectively, and a central control station that is connected with each of radio base stations #1 to #3. Radio base stations #1 to #3 and the central control station can communicate information with each other via $X_2$ signaling, via wired connection such as fiber and/or the like, or via wireless connection. Assume, for example, that the central control station is the macro base station in FIG. 9, and radio base stations #1 to #3 are the small base stations in FIG. 9.

Figure 10A:
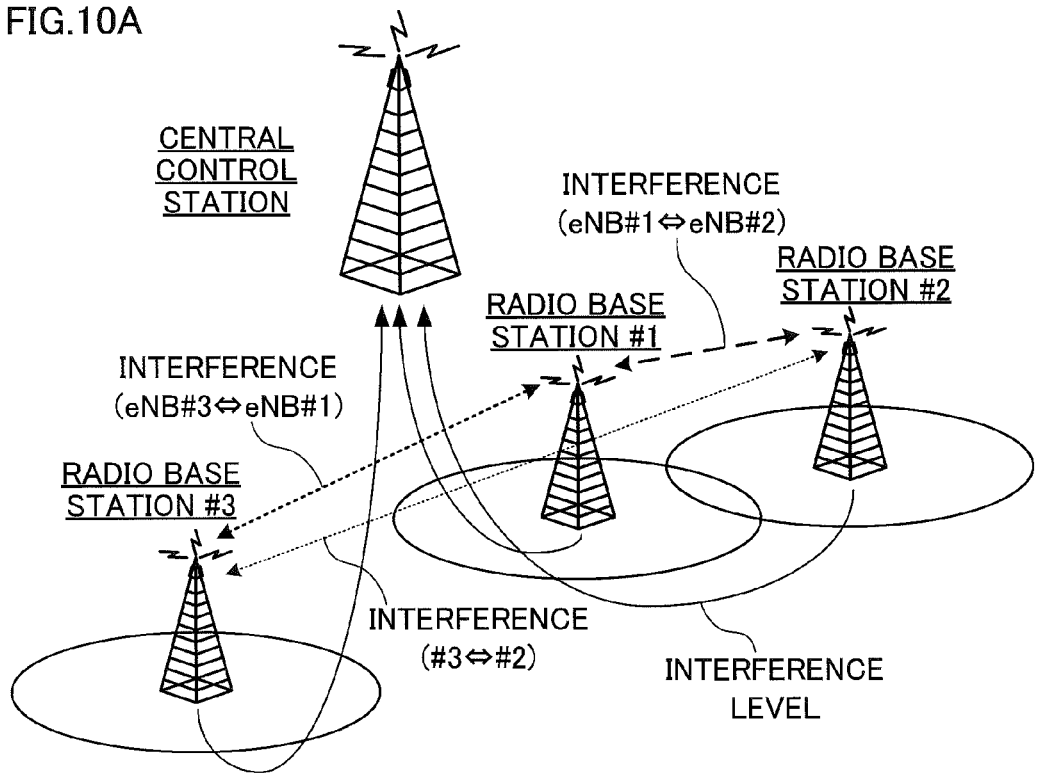
FIG. 10 provides diagrams to show examples of a radio communication system having a central control station.

Radio base stations #1 to #3 each measure the interference levels from the other radio base stations, and report information about the interference levels to the central control station (see FIG. 10A). For example, in each UL subframe, radio base stations #1 to #3 measure the interference levels from downlink signals that are transmitted from the other radio base stations, and report the results to the central control station. As the interference levels, the interference level received from each radio base station may be reported, or the sum value of the interference levels received from a plurality of radio base stations may be reported. When the interference level is measured on per radio base station basis, it is possible to measure each radio base station's interference level separately by using cell-specific (or transmitting/receiving point-specific, radio base station-specific, and so on) reference signal sequences.

Figure 10B:
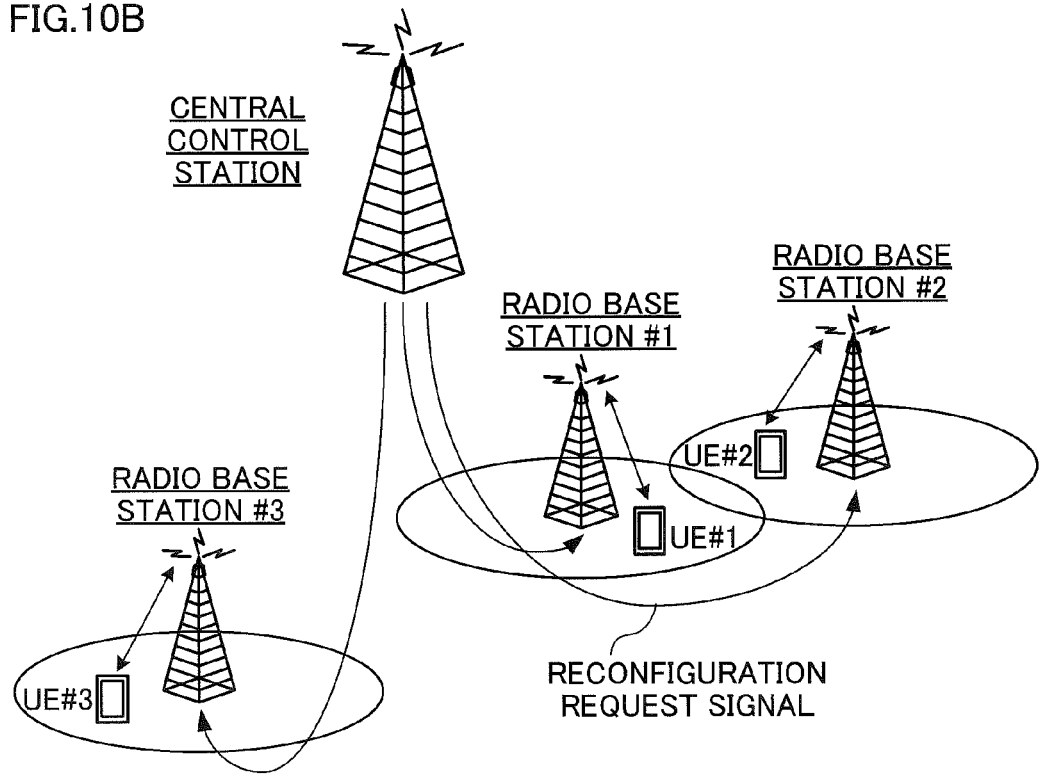

Based on the interference levels reported from radio base stations #1 to #3, the central control station transmits reconfiguration request signals to each of radio base stations #1 to #3 (see FIG. 10B). The reconfiguration request signals may be a request to reconfigure the DL/UL configuration, a request to limit the number of DL subframes to associate with (multiplex over) one UL subframe, a request to reconfigure the UL subframe to feed back delivery acknowledgment signals, a request to reconfigure the transmission power, and so on.

For example, assume a case where radio base station #1 to transmit a UL subframe receives a greater interference level than a predetermined threshold from the other radio base station #2 and/or #3 that transmit DL subframes. In this case, the central control station transmits reconfiguration request signals to part or all of radio base stations #1 to #3 based on information about the interference levels reported from radio base station #1.

Also, the central control station reports a reconfiguration request signal to request a reconfiguration of the DL/UL configuration to radio base station #2 and/or #3 interfering with radio base station #1. As for the DL/UL configuration after the reconfiguration, the same DL/UL configuration as in radio base station #1 may be used. By this means, it is possible to prevent radio base station #1 from receiving interference from radio base station #2 and/or #3. Note that the central control station may report a reconfiguration request signal to request a reconfiguration of the DL/UL configuration to radio base station #1 as well (for a reconfiguration to the same DL/UL configuration as in radio base station #2 and/or #3 that serve as interfering stations).

Also, the central control station can report a reconfiguration request signal to limit the number of DL subframes to associate with one UL subframe, to radio base station #1. By this means, it is possible to reduce the delivery acknowledgment signals and so on to feed back in a UL subframe that is interfered with, so that it is possible to reduce the deterioration of communication quality performance. In this case, the same mechanism as in above FIG. 6 can be applied.

Also, when radio base station #1 receives significant interference from the other radio base station #2 and/or #3, the central control station transmits a change request signal to reconfigure the UL subframe to feed back uplink control signals (for example, delivery acknowledgment signals) to radio base station #1. As for the UL subframe after the reconfiguration, it is possible to use a UL subframe where the interference level to receive from the other radio base station #2 and/or #3 is equal to lower than predetermined threshold. In this case, the same mechanism as in above FIG. 7 can be applied.

Also, the central control station transmits a reconfiguration request signal to reconfigure the transmission power (for example, reduce the transmission power), to radio base station #2 and/or #3 that interfere with radio base station #1. By this means, it is possible to reduce the interference which downlink signals transmitted from radio base station #2 and/or #3 cause against radio base station #1 that receives uplink signals.

As described above, one aspect of the radio communication method according to the third example is a radio communication method to provide a plurality of radio base stations that can each control the DL/UL configuration on a changing basis, a user terminal that can communicate with the radio base stations by means of time division duplexing, and a central control station that is connected with the plurality of radio base stations, in which each radio base station measures the interference levels from the other radio base stations in at least a UL subframe, and reports information about the measured interference levels to the central control station, and, based on the information about the interference levels, the central control station transmits a reconfiguration request signal to request a reconfiguration of the DL/UL configuration, the feedback method or the transmission power, to a predetermined radio base station.

Fourth Example

A case will be described here with a fourth example where each radio base station measures the interference levels that is received from the other radio base stations, and reports information about the interference levels to the other radio base stations that serve as interfering stations, and, based on the information about the interference levels received, the other radio base stations reconfigure the DL/UL configuration, the feedback method, the transmission power and so on (see FIG. 11). That is, the fourth example is structured so that each radio base station reports information about the interference levels, to other radio base stations from which interference is received, without involving a central control station.

Figure 11:
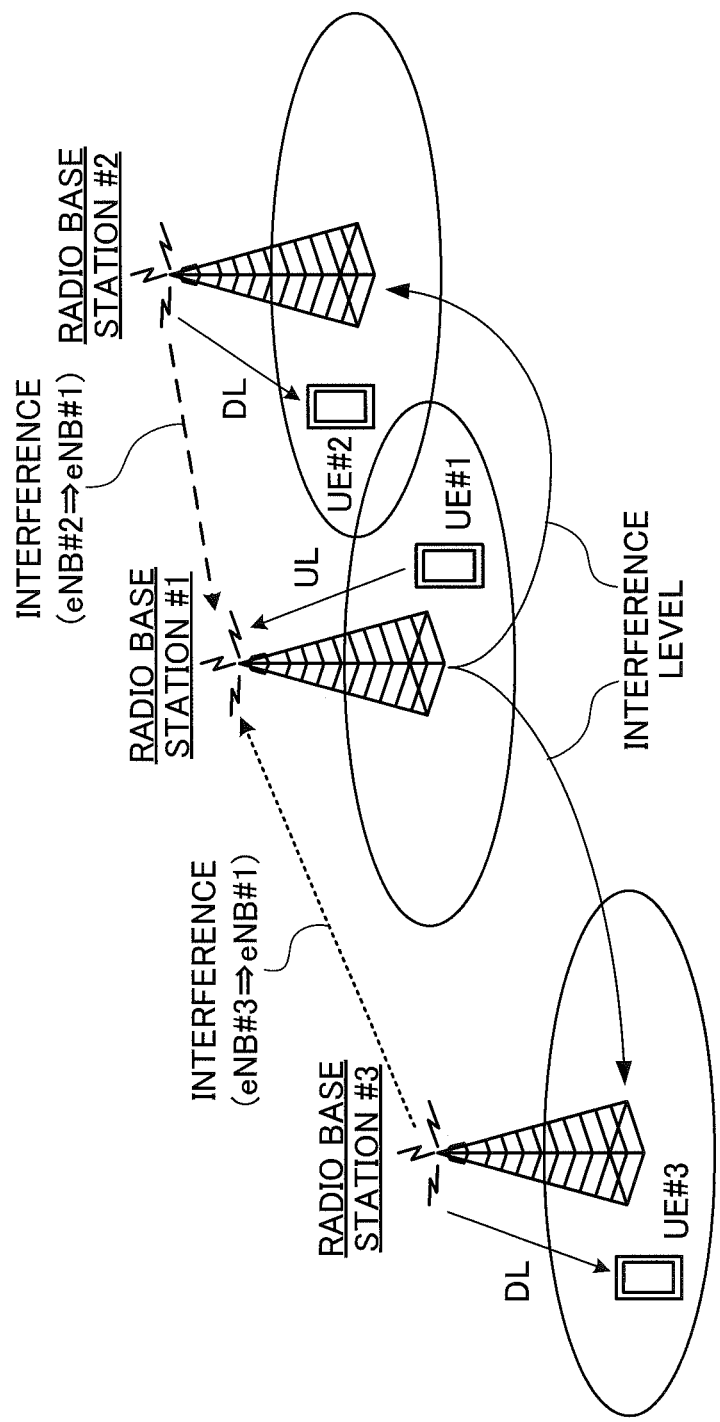
FIG. 11 is a diagram to show an example of a radio communication system where the interference level is transmitted and received between radio base stations.

For example, assume a case where the interference level which radio base station #1 to transmit a UL subframe receives from another radio base stations #2 to transmit a DL subframe is greater than a predetermined threshold, and the interference level which radio base station #1 receives from radio base station #3 is lower than the predetermined threshold (see FIG. 11).

In this case, radio base station #1 reports information about the interference levels received from radio base stations #2 and #3 to radio base stations #2 and #3, respectively. The interference level from each radio base station can be measured by using, for example, cell-specific (or transmitting/receiving point-specific, radio base station-specific, and so on) reference signal sequences.

Radio base stations #2 and #3 reconfigure the DL/UL configuration and/or the transmission power based on the information about the interference levels reported from radio base station #1. In the case of FIG. 11, radio base station #3 does not reconfigure the DL/UL configuration or the transmission power because the level interference against radio base station #1 is equal to or lower than a predetermined threshold. Meanwhile, radio base station #2 reconfigures the DL/UL configuration (for example, to the same DL/UL configuration as in radio base station #1) or reduce the transmission power because the interference level against radio base station #1 is greater than the predetermined threshold.

By this means, it is possible to reduce the interference which downlink signals that are transmitted from radio base station #2 cause against radio base station #1 that receives uplink signals. Note that radio base station #2 does not necessarily have to reconfigure the DL/UL configuration and/or the transmission power in response to a reconfiguration request signal from radio base station #1, and can determine whether or not a reconfiguration is necessary, based on the communication environment and so on. Also, a radio base station that has transmitted a reconfiguration request signal to another radio base station may limit the number of DL subframes to associate with (multiplex over) one UL subframe, reconfigure the UL subframe to feed back delivery acknowledgment signals and so on, in the subject apparatus.

In this way, even when different DL/UL configurations are applied between neighboring transmission points (radio base stations), it is still possible to effectively reduce the deterioration of communication quality due to interference, by controlling the DL/UL configuration, the transmission power and so on of each radio base station based on information about the interference levels from other radio base stations.

Note that, although a case has been described with reference to FIG. 11 where each radio base station measures the interference levels that is received from the other radio base stations and reports information about the interference levels to the other radio base stations, the present embodiment is by no means limited to this. For example, it is equally possible to employ a structure in which a radio base station that has measured the interference levels from the other radio base stations reports the above-noted reconfiguration request signals to the other radio base stations. That is, although the third example is structured to report reconfiguration request signals to other radio base stations that cause interference, via a central control station, it is equally possible to employ a structure in which a radio base station that receives interference (interfered station) reports a reconfiguration request signal directly to the interfering radio base station (interfering station).

As described above, one aspect of the radio communication method of the fourth example is a radio communication method to provide a plurality of radio base stations that can each control the DL/UL configuration on a changing basis and a user terminal that can communicate with the radio base stations by means of time division duplexing is provided, in which each radio base station measures the interference levels from the other radio base stations in at least a UL subframe, and reports information about the measured interference levels to the other radio base stations, and the other radio base stations control the reconfiguration of the DL/UL configuration and/or the transmission power based on the information about the interference levels.

Now, an example overall structure of a radio base station according to the present embodiment will be described below with reference to the accompanying drawings.

Figure 12:
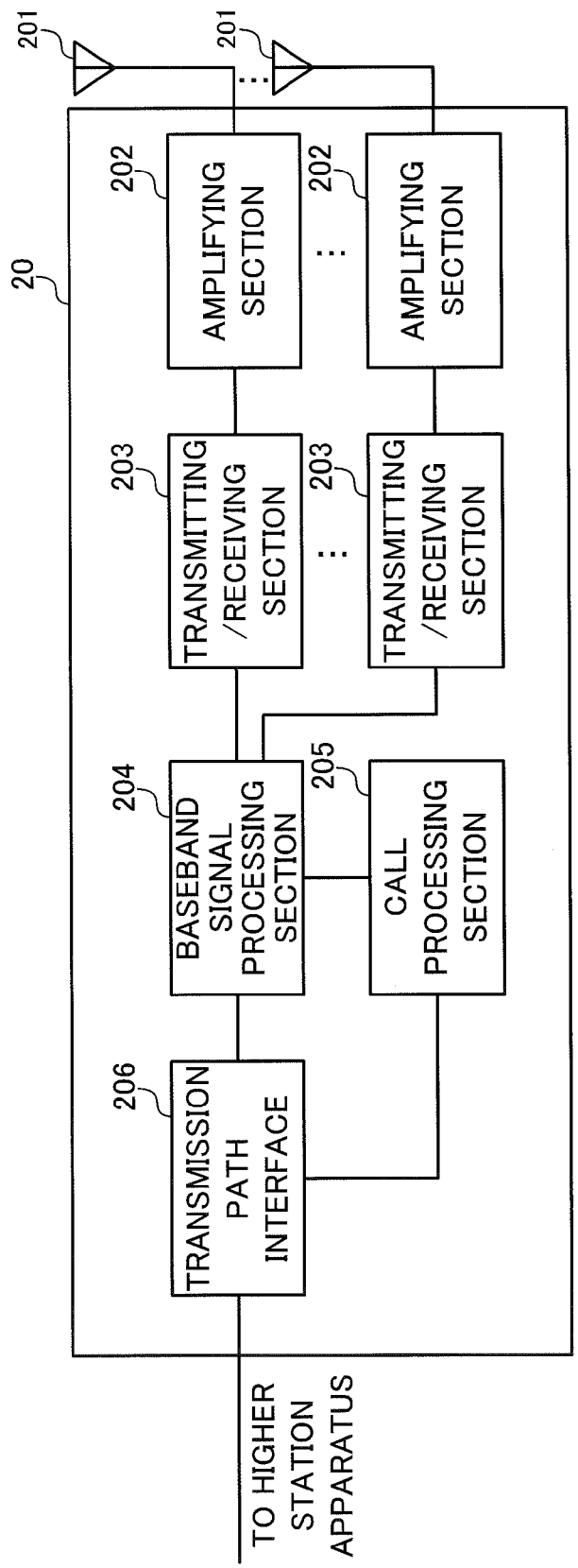
FIG. 12 is a diagram to explain an overall structure of a radio base station.

A radio base station 20 has transmitting/receiving antennas 201, amplifying sections 202, transmitting/receiving sections (transmitting section/receiving section) 203, a baseband signal processing section 204, a call processing section 205 and a transmission path interface 206 (see FIG. 12). Also, each radio base station is connected with a higher station apparatus (not shown) on the core network. The higher station apparatus may be, for example, an access gateway apparatus, a mobility management entity (MME) and so on, but is by no means limited to these.

Also, when radio base stations and a central control station are provided, both may be provided in the structure shown in FIG. 12. In this case, the radio base stations and the central control station can communicate information with each other via $X_2$ signaling or via wired link such as fiber and/or the like. Also, the radio base stations may be connected with the central control station via radio link as well.

Furthermore, the radio base stations may be base stations referred to as "eNodeBs," "transmitting/receiving points" and so on, or may be base stations that have local cover areas and are referred to as "pico base stations," "femto base stations," "Home eNodeBs," "RRHs (Remote Radio Heads)," "micro base stations," "transmitting/receiving points," and so on Referring to FIG. 12, transmission data that is transmitted from the radio base station 20 to user terminals on the downlink is input from the higher station apparatus 30, into the baseband signal processing section 204, via the transmission path interface 206.

In the baseband signal processing section 204, a downlink data channel signal is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

Also, the baseband signal processing section 204 reports control information for allowing each user terminal 10 to perform radio communication with the radio base station 20, to the user terminals 10 connected to the same cell, by a broadcast channel. The information for allowing communication in the cell includes, for example, the uplink or downlink system bandwidth, root sequence identification information (root sequence indices) for generating random access preamble signals in the PRACH (Physical Random Access Channel), and so on.

Baseband signals that are output from the baseband signal processing section 204 are converted into a radio frequency band in the transmitting/receiving sections 203. The amplifying sections 202 amplify the radio frequency signals having been subjected to frequency conversion, and output the results to the transmitting/receiving antennas 201.

Meanwhile, as for signals that are transmitted from user terminals to the radio base station 20 on the uplink, radio frequency signals that are received in the transmitting/receiving antennas 201 are amplified in the amplifying sections 202, converted into baseband signals through frequency conversion in the transmitting/receiving sections 203, and input in the baseband signal processing section 204.

The baseband signal processing section 204 performs an FFT process, an IDFT process, error correction decoding, a MAC retransmission control receiving process, and RLC layer and PDCP layer receiving processes of the transmission data that is included in the baseband signals received on the uplink. The decoded signals are transferred to the higher station apparatus through the transmission path interface 206.

The call processing section 205 performs call processing such as setting up and releasing communication channels, manages the state of the radio base station 20 and manages the radio resources.

Figure 13:
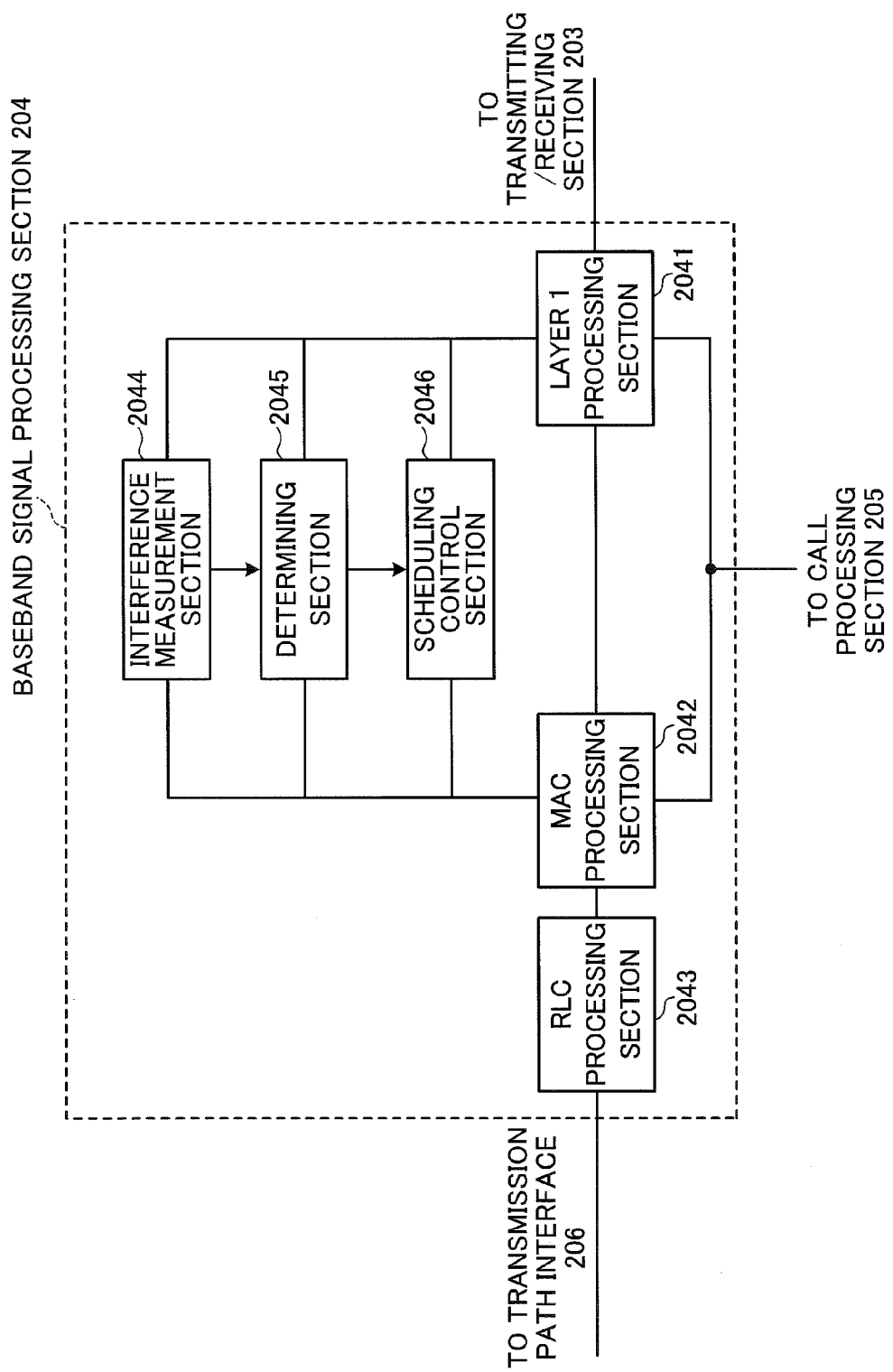
FIG. 13 is a functional block diagram to correspond to a baseband processing section of a radio base station.

FIG. 13 is a block diagram to show an example structure of a baseband signal processing section in the radio base station shown in FIG. 12. The baseband signal processing section 204 is primarily formed with a layer 1 processing section 2041, a MAC processing section 2042, an RLC processing section 2043, an interference measurement section 2044, a determining section 2045 and a scheduling section 2046.

The layer 1 processing section 2041 mainly performs processes related to the physical layer. For example, the layer 1 processing section 2041 applies processes to signals received on the uplink, including channel decoding, a discrete Fourier transform (DFT), frequency demapping, an inverse fast Fourier transform (IFFT) and data demodulation. Also, the layer 1 processing section 2041 applies processes to signals to transmit on the downlink, including channel coding, data modulation, frequency mapping and an inverse fast Fourier transform (IFFT).

The MAC processing section 2042 performs processes for signals that are received on the uplink, including MAC layer retransmission control, scheduling for the uplink/downlink, transport format selection for the PUSCH/PDSCH, resource block selection for the PUSCH/PDSCH and so on.

The RLC processing section 2043 performs, for packets that are received on the uplink/packets to transmit on the downlink, packet division, packet combining, RLC layer retransmission control, and so on.

The interference measurement section 2044 measures the interference level from other radio base stations. For example, in the case of the above first example (see FIG. 5A), the interference measurement section 2044 in radio base station #1 measures the interference level from another radio base stations #2. Also, in the case of the above second example (see FIG. 9), the interference measurement section 2044 in each small base station measures the interference levels from the other radio base stations. Also, in the case of the above third and fourth examples (see FIG. 10 and FIG. 11), the interference measurement section 2044 in radio base station #1 measures the interference levels from the other radio base stations #2 and #3. Note that other radio base stations to be subject to measurements of interference levels may be determined in advance.

As for the interference levels, interference levels may be measured based on part or all of, for example, downlink reference signals (CRSs, CSI-RSs and so on), downlink data signal, downlink control channel signal, the direction in which the downlink signals are transmitted. Also, the interference measurement section 2044 has only to measure the interference level in at least a UL subframe, and may skip measuring the interference level in DL subframes.

The determining section 2045 determines the magnitude of the interference levels measured in the interference measurement section 2044. For example, the determining section 2045 compares a measured interference level against a threshold that is determined in advance, and outputs the result of the comparison to the scheduling control section 2046. Note that the function of the determining section 2045 may be provided in the interference measurement section 2044 as well.

Based on the results (or interference levels) determined in the determining section 2045, the scheduling control section 2046 controls the method of feeding back delivery acknowledgment signals in response to the PDSCH signal of each DL subframe. For example, based on results output from the determining section 2045, the scheduling control section 2046 limits the number of DL subframes to associate with (multiplex over) a UL subframe (see FIG. 6 above), or reconfigures the UL subframe to feed back uplink control signals (for example, delivery acknowledgment signals) (see FIG. 7 above).

The scheduling control section 2046 can include the scheduling result of the delivery acknowledgment signals in response to the PDSCH signal of each DL subframe in downlink control information (DCI) and so on, and report this to the user terminals. The radio base station can execute the determining procedures of above FIG. 8 by using the interference measurement section 2044, the determining section 2045 and the scheduling control section 2046.

Also, as has been shown with the fourth example (FIG. 11), it is equally possible to employ a structure, in which, when the interference level is reported from other radio base stations, the scheduling control section 2046 controls the DL/UL configuration to apply based on the interference levels received. Also, the radio base station may have a power control section that reconfigures the transmission power.

Also, as has been shown with the above third example (FIG. 10), when each radio base station reports interference levels to the central control station, each radio base station's scheduling control section 2046 can control the reconfiguration of the DL/UL configuration, the number of DL subframes to associate with one UL subframe, the UL subframe to feed back uplink control signals (for example, delivery acknowledgment signals), and so on. Also, the central control station may be structured to have a reconfiguration request signal generating section that determines the content of the reconfiguration request to report to each radio base station based on the interference levels reported from each radio base station, and generates reconfiguration request signals.

Note that the function of the scheduling control section 2046 may be provided in the determining section 2045, or may be provided in the scheduler that is provided in the MAC processing section 2042 (or in other function sections).

Next, an overall structure of a user terminal according to the present embodiment will be described with reference to FIG. 14. A user terminal 10 has transmitting/receiving antennas 101, amplifying sections 102, transmitting/receiving sections (transmitting section/receiving section) 103, a baseband signal processing section 104 and an application section 105.

As for downlink data, radio frequency signals that are received in the transmitting/receiving antennas 101 are amplified in the amplifying sections 102, and converted into baseband signals through frequency conversion in the transmitting/receiving sections 103. The baseband signals are subjected to an FFT process, error correction decoding, a retransmission control receiving process and so on, in the baseband signal processing section 104. In this downlink data, downlink transmission data is transferred to the application section 105. The application section 105 performs processes related to higher layers above the physical layer and the MAC layer, and so on. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process and an IFFT process. Baseband signals that are output from the baseband signal processing section 104 are converted into a radio frequency band in the transmitting/receiving sections 103. After that, the amplifying sections 102 amplify the radio frequency signals having been subjected to frequency conversion, and transmit the results from the transmitting/receiving antennas 101.

Figure 14:
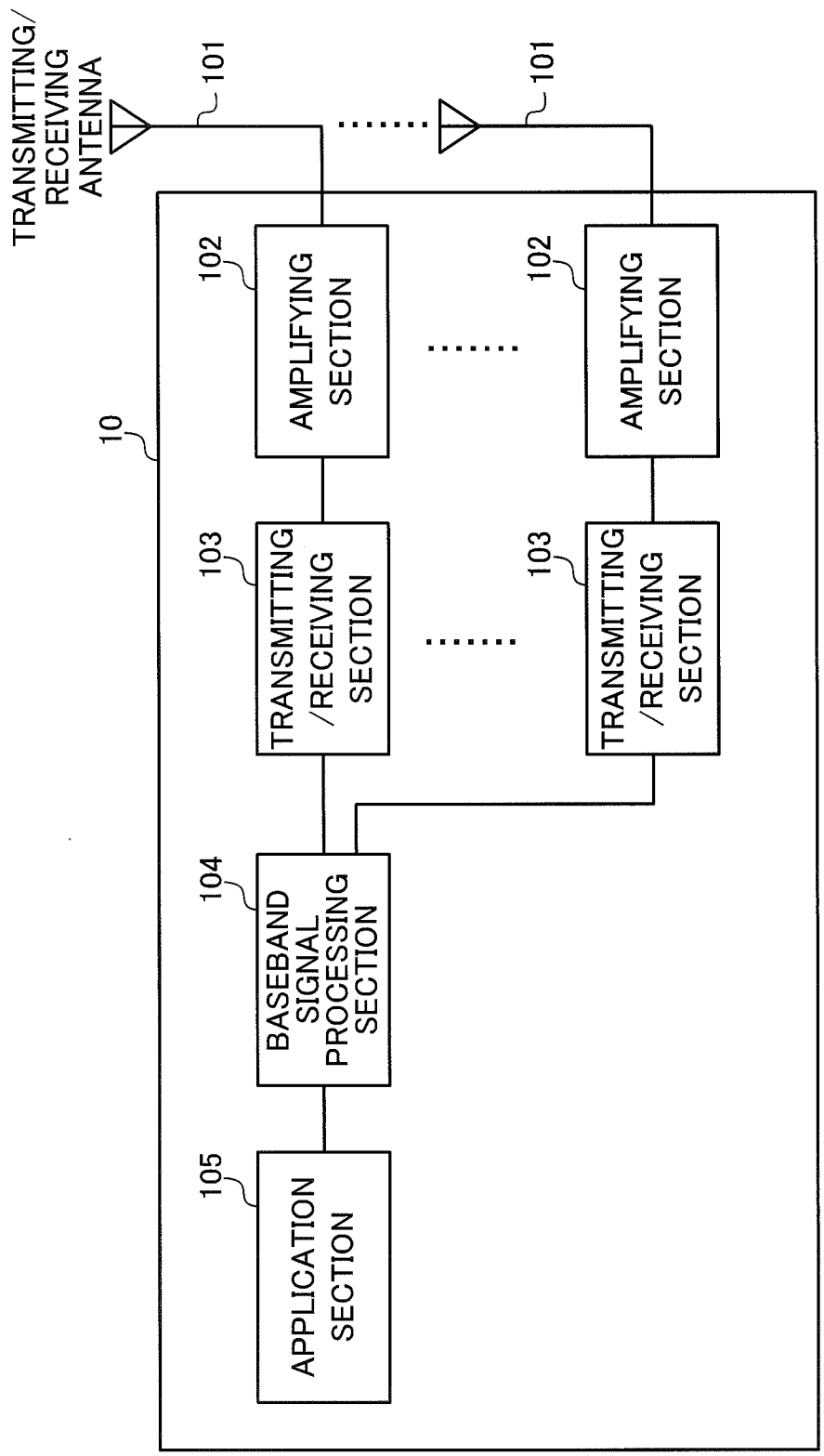
FIG. 14 is a diagram to explain overall structure of a user terminal.
Figure 15:
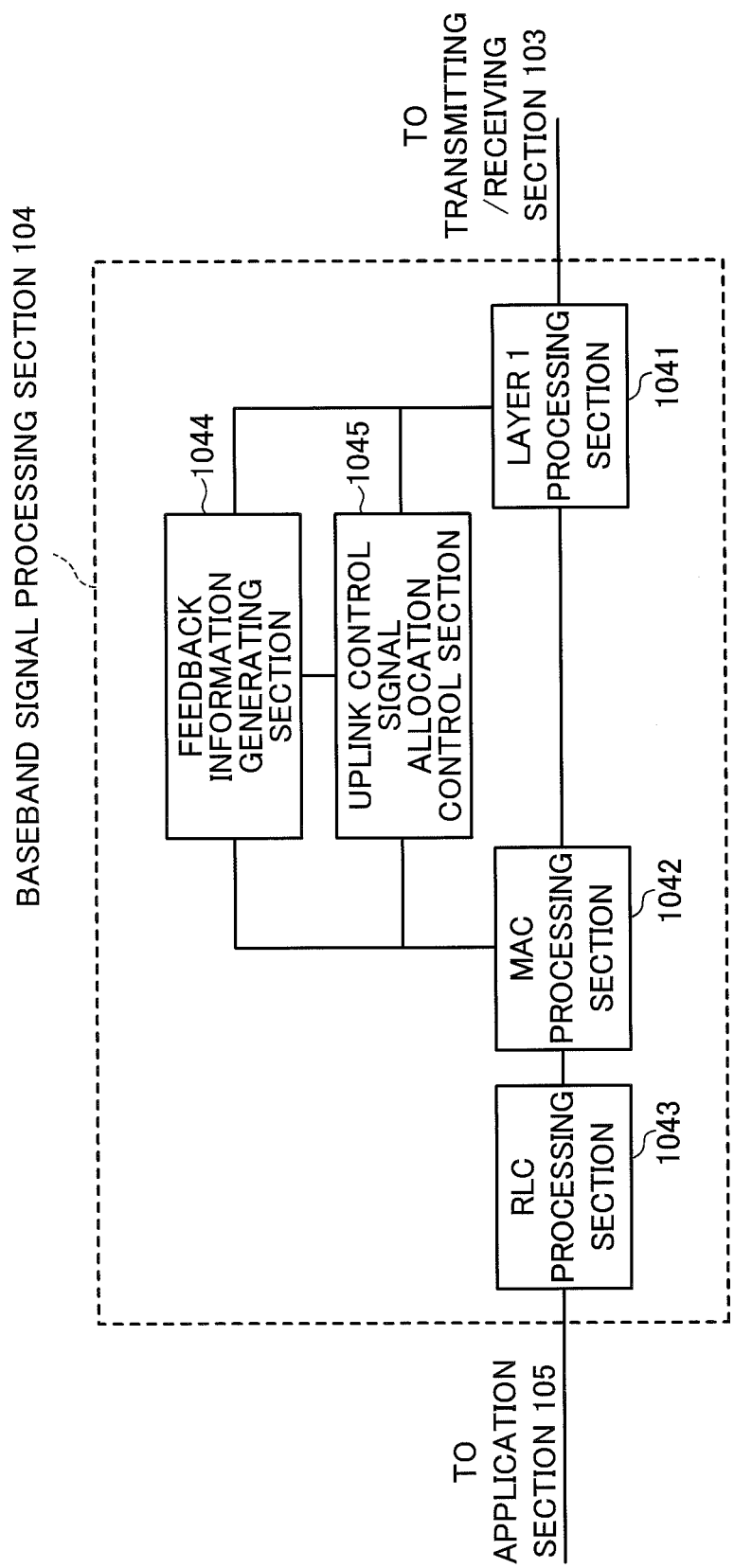
FIG. 15 is a functional block diagram to correspond to a baseband processing section of a user terminal.

FIG. 15 is a block diagram to show an example structure of the baseband signal processing section in the user terminal shown in FIG. 14. The baseband signal processing section 104 is primarily formed with a layer 1 processing section 1041, a MAC processing section 1042, an RLC processing section 1043, a feedback information generating section 1044 and an uplink control signal allocation control section 1045.

The layer 1 processing section 1041 mainly performs processes related to the physical layer. The layer 1 processing section 1041, for example, applies processes such as channel decoding, a discrete Fourier transform (DFT), frequency demapping, an inverse fast Fourier transform (IFFT) and data demodulation to a signal received on the downlink. Also, the layer 1 processing section 1041 applies processes to a signal to transmit on the uplink, including channel coding, data modulation, frequency mapping and an inverse fast Fourier transform (IFFT).

The MAC processing section 1042 performs, for the signal received on the downlink, MAC layer retransmission control (HARQ), an analysis of downlink scheduling information (specifying the PDSCH transport format and specifying the PDSCH resource blocks) and so on. Also, the MAC processing section 1042 performs, for the signal to transmit on the uplink, MAC retransmission control, an analysis of uplink scheduling information (specifying the PUSCH transport format and specifying the PUSCH resource blocks) and so on.

The RLC processing section 1043 performs, for the packets received on the downlink/the packets to transmit on the uplink, packet division, packet coupling, RLC layer retransmission control, and so on.

The feedback information generating section 1044 generates feedback information such as uplink control signals. For example, the feedback information generating section 1044 generates the delivery acknowledgment signals (ACKs/NACKs) to feed back to the radio base station in a UL subframe, based on the result of receiving the PDSCH signals transmitted in each DL subframe.

The uplink control signal allocation control section 1045 controls the allocation of PUCCH signals, including the delivery acknowledgment signals and so on, based on uplink scheduling information that is reported from the radio base station. For example, the uplink control signal allocation control section 1045 selects the UL subframe to feed back the delivery acknowledgment signals in response to each PDSCH signal by using the uplink scheduling information (for example, DCI formats 0 and 4 and so on) included in downlink control information (DCI).

For example, when the PDCCH signal which a radio base station receives in a given UL subframe receives significant interference from another radio base station's downlink signal, the radio base station commands the user terminal to limit the number of delivery acknowledgment signals to multiplex over this UL subframe or reconfigure the UL subframe to use for feedback. Based on the uplink scheduling information reported from the radio base station, the uplink control signal allocation control section 1045 controls the number of delivery acknowledgment signals to multiplex over a UL subframe, the UL subframe to feed back and so on, as appropriate.

As has been described above, by controlling the limit of the number of DL subframes to multiplex and the reconfiguration of the UL subframe to feed back PUCCH signals based on the interference level received in a UL subframe, it is possible to reduce the impact of interference by downlink signals that are transmitted from neighboring transmission points (radio base stations). As a result of this, even when different DL/UL configurations are applied between neighboring transmitting/receiving points, it is still possible to reduce the deterioration of communication quality performance.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way. Also, it is possible to combine and apply each embodiment herein as appropriate.

The disclosure of Japanese Patent Application No. 2013-004528, filed on Jan. 15, 2013, including the specification, drawings and abstract, is incorporated herein by reference in its entirety.

The invention claimed is:

1. A radio base station that can communicate with a user terminal by means of time division duplexing and furthermore change and control a DL/UL configuration, the radio base station comprising:
   an interference measurement circuit that measures an interference level from another radio base station in at least a UL subframe; and
   a scheduling control circuit that changes a feedback method of uplink control signals, which the user terminal feeds back in the UL subframe in response to downlink signals that have been transmitted in DL subframes, based on the measured interference level,
   wherein in accordance with the interference level in the UL subframe, the scheduling control circuit limits the number of DL subframes having feedback transmitted in the UL subframe by the user terminal.

2. The radio base station according to claim 1, further comprising a determining circuit that compares the measured interference level against a predetermined threshold.

3. The radio base station according to claim 2, wherein, when the interference level in the UL subframe is greater than the predetermined threshold, the scheduling control circuit executes control so that part of the uplink control signals that are fed back in the UL subframe when the interference level is equal to lower than the predetermined threshold are fed back in a UL subframe that comes after the UL subframe.

4. The radio base station according to claim 2, wherein, when the interference level in the UL subframe is greater than the predetermined threshold, the scheduling control circuit executes control so that all or the uplink control signals that are fed back in the UL subframe when the interference level is equal to lower than the predetermined threshold are fed back in a UL subframe that comes after the UL subframe.

5. The radio base station according to claim 2, wherein, when the user terminal is connected with the radio base station by time division duplexing and connected with another radio base station by frequency division duplexing, and the interference level in the UL subframe is greater than the predetermined threshold, the scheduling control circuit executes control so that the uplink control signals that are fed back in the UL subframe when the interference level is equal to lower than the predetermined threshold are fed back in a UL subframe in frequency division duplexing.

6. The radio base station according to claim 2, wherein the scheduling control circuit limits the number of DL subframes to associate with the UL subframe is accordance with the interference level in the UL subframe.

7. The radio base station according to claim 1, wherein the uplink control signals comprise at least a delivery acknowledgment signal.

8. The radio base station according to claim 1, wherein the interference measurement circuit measures the interference level by using at least one of a reference signal that is transmitted from another radio base station, a data signal, a control signal and a direction of transmission.

9. A user terminal that communicates with a radio base station that can change and control a DL/UL configuration, by means of time division duplexing, the user terminal comprising:
   a generating circuit that generates an uplink control signal in response to a downlink signal transmitted from the radio base station;
   a receiving circuit that receives uplink scheduling information, which the radio base station determines based on an interference level from another radio base station in at least a UL subframe; and
   an allocation control circuit that controls allocation of the generated uplink control signal based on the uplink scheduling information,
   wherein in accordance with the interference level in the UL subframe, the radio base station limits the number of DL subframes having feedback transmitted in the UL subframe by the user terminal.

10. A radio communication method for a plurality of radio base stations that each can change and control a DL/UL configuration, and a user terminal that communicates with the radio base stations by means of time division duplexing, the radio communication method comprising, in each radio base station, the steps of:
    measuring interference levels from the other radio base stations in at least a UL subframe; and
    changing and controlling a feedback method of uplink control signals which the user terminal feeds hack in the UL subframe in response to downlink signals that have been transmitted in DL subframes, based on the measured interference level,
    wherein in accordance with the interference level in the UL subframe, each radio base station limits that number of DL subframes having feedback transmitted in the UL subframe by the user terminal.

* * * * *